US012723438B2

(12) United States Patent
Hommel

(10) Patent No.: US 12,723,438 B2
(45) Date of Patent: Sep. 1, 2026

(54) LOCK

(71) Applicant: ABUS August Bremicker Söhne KG, Wetter-Volmarstein (DE)

(72) Inventor: Martin Hommel, Rehe (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 94 days.

(21) Appl. No.: 18/610,796

(22) Filed: Mar. 20, 2024

(65) Prior Publication Data

US 2024/0337138 A1 Oct. 10, 2024

(30) Foreign Application Priority Data

Apr. 6, 2023 (DE) ......................... 102023108955.2

(51) Int. Cl.
*E05B 67/02* (2006.01)
*E05B 67/10* (2006.01)
*E05B 71/00* (2006.01)

(52) U.S. Cl.
CPC .............. *E05B 67/02* (2013.01); *E05B 67/10* (2013.01); *E05B 71/00* (2013.01)

(58) Field of Classification Search
CPC .......... E05B 67/02; E05B 67/08; E05B 67/10; E05B 71/00
See application file for complete search history.

(56) References Cited

U.S. PATENT DOCUMENTS 1,636,381 A * 7/1927 Megie ..................... E05B 67/24 70/52
3,422,643 A * 1/1969 Foote ...................... E05B 67/02 70/371
3,835,675 A * 9/1974 Lippisch ................. E05B 67/02 70/52
4,112,715 A * 9/1978 Uyeda ..................... E05B 67/24 70/52

(Continued)

FOREIGN PATENT DOCUMENTS

CN 211144081 U 7/2020
CN 113389443 B 9/2021

(Continued)

*Primary Examiner* — Christopher J Boswell
(74) *Attorney, Agent, or Firm* — Dickinson Wright PLLC

(57) ABSTRACT

A lock, in particular a two-wheeler lock or padlock, having a lock body including a lock housing and comprising at least one locking element receiver, a locking element which can be brought into a locked state in which it is inserted with a locking section into the locking element receiver, and a locking mechanism which is at least partially accommodated in the lock housing and is configured to selectively block the locking element in its locked state from leaving the locking element receiver or to release it for leaving the locking element receiver, the lock housing comprising a cup element having a base and a circumferential wall projecting from the base and a cover element for closing the cup element. The cup element comprises a through-opening through which the locking section of the locking element can be inserted into the locking element receiver and an engaging section. The (Continued)

cover element comprises a cover section and a leg projecting therefrom that engages behind the engaging section of the cup element in order to secure the cover element to the cup element.

21 Claims, 2 Drawing Sheets

(56) References Cited

U.S. PATENT DOCUMENTS

| | | | | |
|---|---|---|---|---|
| 4,290,279 | A | 9/1981 | Fish et al. | |
| 4,419,873 | A * | 12/1983 | Sopko | E05B 67/38 70/52 |
| 6,508,086 | B2 | 1/2003 | Chen | |
| 7,437,898 | B2 | 10/2008 | Su | |
| 7,481,084 | B1 | 1/2009 | Wu | |
| 7,581,423 | B2 | 9/2009 | Brojanac et al. | |
| 7,712,339 | B2 * | 5/2010 | Hentschel | E05B 67/003 70/30 |
| 8,156,772 | B2 * | 4/2012 | Buhl | E05B 71/00 70/53 |
| 8,881,599 | B2 | 11/2014 | Ganser | |
| 9,217,265 | B2 * | 12/2015 | Muller | E05B 67/003 |
| 12,006,736 | B2 * | 6/2024 | Lin | E05B 27/0003 |
| 12,077,988 | B2 * | 9/2024 | Sieme | E05B 67/003 |
| 12,241,286 | B2 * | 3/2025 | Fan | E05B 9/084 |

FOREIGN PATENT DOCUMENTS

| | | | |
|---|---|---|---|
| CN | 215108158 | U | 12/2021 |
| DE | 4434585 | A1 | 4/1996 |
| DE | 202009010028 | U1 | 11/2009 |
| DE | 102009025951 | A1 | 12/2009 |
| DE | 202010010675 | U1 | 10/2010 |
| DE | 202014102326 | U1 | 7/2014 |
| DE | 102018006121 | A1 | 2/2020 |
| DE | 102013210475 | A1 | 7/2020 |
| DE | 102019001224 | A1 | 8/2020 |
| DE | 102019113378 | A1 | 11/2020 |
| DE | 202019105979 | U1 | 1/2021 |
| DE | 102020126124 | A1 | 4/2022 |
| FR | 2503077 | A1 | 10/1982 |
| WO | 2020199361 | A1 | 10/2020 |

* cited by examiner

LOCK

CROSS-REFERENCE TO RELATED APPLICATION

This application claims the benefit and priority of German Patent Application No. 102023108955.2 filed on Apr. 6, 2023. The entire disclosure of the above application is incorporated herein by reference.

FIELD

The invention relates to a lock, in particular a two-wheeler lock or padlock, having a lock body including a lock housing and comprising a locking element receiver, a locking element which can be brought into a locked state in which the locking element is inserted with a locking section into the locking element receiver, and a locking mechanism which is accommodated in the lock housing and is configured to selectively block the locking element in its locked state from leaving the locking element receiver or to release it for leaving the locking element receiver.

BACKGROUND

Such a lock may in particular serve to secure a movable object to a fixed object. For this purpose, it is advantageous when the locking element forms a ring-shaped closed structure in the locked state, where applicable together with the lock body. In this way, the locking element may be guided through an opening of the movable object (e.g. the struts and/or the wheel spokes of a two-wheeler) as well as around the fixed object (e.g. a lamppost) or through an opening of the fixed object (e.g. a fence or a two-wheeler stand) in order to secure the movable object to the fixed object. In this regard, it is expedient that the locked state may be secured by the locking mechanism and the ring-shaped closed structure may be selectively opened only by means of the locking mechanism and, in particular, only upon knowing or possessing a locking code (e.g. a key, a code or a biometric feature).

Here it is important that the locking mechanism and its cooperation with the locking element are secured against manipulation. This is helped by a firm lock housing in which the locking element is at least partially accommodated and in which the locking mechanism cooperates with the locking element. However, for the assembly of the locking mechanism and, if necessary, other components of the lock, the lock housing must first be. Moreover, for the replacement of components, for example due to wear or for a reconfiguration of the lock, it may be appropriate if the lock housing may still be opened after assembly, preferably in an easy manner. It is therefore desirable that the lock housing may be locked in a particularly reliable manner and is secured against unauthorized opening, but generally may also be opened again by an authorized person in a simple manner.

Furthermore, with regard to efficient manufacturing, it is advantageous if the assembly of the lock, which includes the closing of the lock housing, may be automated as much as possible.

SUMMARY OF THE INVENTION

It is a task of the present invention to provide a lock, in particular a two-wheeler lock or a padlock, which is easy to handle, is particularly secure and may be assembled in a largely automated manner.

This task is achieved by a lock having the features of claim 1. Advantageous embodiments may be taken from the dependent claims, the present description and the figures.

The lock according to the invention comprises: a lock body having a lock housing and comprising at least one locking element receiver; a locking element which can be brought into a locked state in which it is inserted with a locking section into the locking element receiver; and a locking mechanism which is at least partially accommodated in the lock housing and is configured to selectively block the locking element in its locked state from leaving the locking element receiver or to release it for leaving the locking element receiver.

In other words, when the locking element is in its locked state, i.e. provided that the locking element is in its locked state and thus the locking section is inserted into the locking element receiver, whether the locking section is locked in the locking element receiver or is released therefrom may be selected by operating the locking mechanism therebetween. In this way, the locking section of the locking element can be reliably locked at the lock body, but may also be released again from the lock body.

For example, the locking mechanism may comprise a latch which is adjustable between a locking position and an unlocking position, wherein the latch is configured to cooperate with the locking section of the locking element in the locking position (for example, by engaging with a locking structure of the locking section and/or by engaging behind a locking structure of the locking section), provided that the locking element is in the locked state, and is thereby blocked against leaving the locking element receiver, while on the other hand, in the unlocking position, the latch releases the locking section for leaving the locking element receiver. The locking structure of the locking section may, for example, comprise an engaging recess (e.g. opening, blind hole, groove).

The latch may then be adjustable between the locking position and the unlocking position (or at least from the locking position to the unlocking position), in particular through an actuation of the locking mechanism. By way of the locking mechanism, the latch may thus be selectively adjusted such that the locking section of the locking element is blocked against leaving the locking element receiver or is released for leaving the locking element receiver.

The locking mechanism is preferably protected against unauthorized manipulation by a locking code. It may be configured mechanical, mechatronic or electronic. For example, the locking mechanism may comprise a lock cylinder that may only be operated by means of a key associated with the lock cylinder. In this case, the locking code is constituted by the key. However, as a locking code, in particular a numerical code, a cryptographic key, an electronic signal and/or a biometric feature may also be considered.

In particular, the locking element may have an elongated form extending from a first end to a second end of a longitudinal extent of the locking element (straight or curved; rigid or flexible). For example, the locking element may be configured as a rigid hoop, wired rope (cable), chain, rod or joint bar arrangement. The locking section may be provided in particular at one of said ends of the longitudinal extent, for example, in the form of a bolt.

The lock may serve in particular (as already explained) to secure a movable object to a fixed object. For this purpose, the lock may advantageously have a ring-shaped closed structure in the locked state of the locking element. The ring-shaped closed structure may be formed by the locking element together with the lock body, for example, when an end of the longitudinal extent of the locking element opposite to the locking section is permanently fixed to the lock body or in a manner similar to how the locking section is lockable to the lock body. It is also possible to form the ring-shaped closed structure only by the locking element, for example, if the locking element has, in particular at an end of its longitudinal extent opposite to the locking section, an eyelet through which the locking section may be threaded to form a loop as a ring-shaped closed structure before the locking section is then locked to the lock body. However, a ring-shaped closed structure is not absolutely essential; for example, the locking element may comprise a single (in particular elongate) bolt.

According to the invention, the lock housing comprises a cup element having a base and a circumferential wall projecting from the base, as well as a cover element which closes the cup element. The material of the cup element and of the cover element each may be in particular of a metal, preferably a hardened metal.

The cover element may, for example, be formed as a cover plate, in particular as a stamped and bent part. Alternative to a metal design, the cup element and the cover element each may also comprise of a plastic, a ceramic or a combination of these materials.

The cup element and the cover element are each formed preferably as an integral one-piece, in particular of metal. An integral one-piece design means that the cup element or the cover element is originally formed as a single cohesive part, which may be produced for example by casting and is subsequently formed. Such a cup element or cover element thus differs in particular from elements which are assembled from two or more parts whose individual components are connected to form a detachable or permanent joint, such as by welding or screwing.

With regard to the load-bearing structure of the lock housing which surrounds an interior space for the locking mechanism and protects it against violent attack, the lock housing preferably comprises only of the cup element and the cover element.

The cup element may be formed in particular by deep-drawing or casting (for example, plastic injection-molding or ceramic casting). Generally, manufacture by a firing process is also a possibility. For example, the cup element may be formed as a deep-drawn sheet metal part. Preferably, the cup element has a collar reinforcement.

The base of the cup element is preferably formed at least substantially flat. Furthermore, the base may in particular have an at least substantially rectangular form. Alternatively, the base may also for example have a round or oval shape. Moreover, it is conceivable that the base is uneven, for example convexly curved.

The wall may, in whole or in part, project at least substantially perpendicularly from the base. The transition between the base and the wall may be formed as an edge, whereby the edge does not necessarily have to be angular, but may also be rounded. Generally, particularly if the base is curved, a smooth transition between the base and the wall is also conceivable.

In particular, the wall may be circumferential in that it extends completely around an axis which is at least substantially perpendicular to the base. The wall is preferably closed all the way around in order to avoid open seams as much as possible, for example, at corners of the wall. However, this does not exclude that one or more through-openings are formed in the wall.

The wall may further comprise a plurality of wall sections, in particular four, each of which is preferably formed at least substantially planar. Adjacent wall sections may meet one another along corners of the wall, in particular at least substantially perpendicularly, and preferably be joined to one another by a material bond in particular. Like the aforementioned transitions to the base of the cup element, these corners may also be rounded.

As a result of the described design, the interior space of the cup element, which is at the same time the interior space of the lock housing, may in two of three mutually perpendicular spatial directions be bound on both sides respectively by the wall, namely, in particular by a respective one of said wall sections, and in the third spatial direction be bound on one side by the base but having the opposite side open (i.e. is not bound by the cup element). In particular, in that said cover element or at least a cover section (to be described below) of the cover element bounds the interior space on this open side, the cover element may close the cup element.

For example, the cup element may be configured to be at least substantially cuboidal in shape, wherein one side of the cuboid is formed by the base of the cup element and the four adjacent sides of the cuboid being formed by the wall of the cup element, in particular by a respective one of said four wall sections. The cover element or at least a cover section (described further below) of the cover element may then be arranged appropriately at the remaining side of the cuboid shape, thereby closing the cup element. However, other shapes for the cup element and the cover element may also be considered. Generally, the cup element and the cover element could also be shaped in such a way that the lock housing is spherical, for example.

According to the invention, the cup element comprises at least a first through-opening through which the locking section of the locking element is insertable into the locking element receiver in order to bring the locking element into the locked state. Preferably, the base of the cup element has the first through-opening. Generally, however, the first through-opening may also be formed, entirely or at least partially, in the wall of the cup element. The locking section of the locking element is insertable into the locking element receiver, in particular from the outside i.e. from outside the lock body, through the first through-opening. The first through-opening may be circumferentially closed, i.e. bound by a continuous circumferential edge. Preferably, the first through-opening is open to the interior space of the lock body or the cup element.

The designation of said through-opening as a first through-opening does not imply that the cup element necessarily has another or a plurality of further through-openings, and it is also not to be understood in the sense of a hierarchy between possibly a plurality of through-openings, but merely serves to be able to conceptually distinguish several through-openings of the cup element, where appropriate.

Since the locking section of the locking element is insertable through the first through-opening into the locking element receiver, the first through-opening forms an entrance of the locking element receiver and in this respect may be considered as part of the locking element receiver. Preferably, the locking section of the locking element may be inserted into the locking element receiver solely through the first through-opening. It is preferred if the first through-opening is circumferentially closed, i.e. is bound by a continuous circumferential edge.

Furthermore, the cup element comprises at least one engaging section. The engaging section may in particular be formed by an edge portion of the first through-opening or by an edge portion of an engaging recess (e.g. recess, opening) separate from the first through-opening. The engaging section may extend in a straight line, in particular as an edge where two planar surfaces meet. The engaging section may be formed for example as a snap-in edge. For example at the engaging section, an edge surface of the first through-opening or an engaging recess separate thereto may meet at a surface of the cup element. Preferably, this edge surface and the surface of the cup element meet at an at least substantially right angle or at an acute angle.

According to the invention, the cover element comprises a cover section and at least one first leg projecting from the cover section.

In particular, the cover section may be configured flat and is preferably substantially planar. Generally, however, the cover element may also be uneven, for example, convexly curved. The shape of the cover section (in regards to its cross-section perpendicular to the spatial direction in which the base and the cover section are arranged opposite to each other and preferably perpendicularly oriented) may correspond at least substantially to the shape of the base of the cup element; in this respect, the shape may in particular be at least substantially rectangular, whereby, however, other shapes, for example, a round or oval shape, may also be considered.

The cup element may thus be closed by the cover section of the cover element. However, this does not necessarily mean as a sealing closure, i.e. openings, gaps or the like may remain between the cover element and the cup element which, for example, may be function-related or be the result of the manufacturing technology. Such openings may also be desired for ventilation or drainage. The boundary of the circumferential wall of the cup element facing away from the base of the cup element may form a receiver for the cover element and in particular may extend within a plane (preferably parallel to the base of the cup element).

The cover element preferably comprises solely of the cover section, the first leg and optionally one or more further leg(s) projecting from the cover section.

The leg or legs of the cover element may in particular be formed elongated and/or have a fastening projection at a free end, as will be explained below.

From the cover section, the first leg and optionally existing further legs may in particular project at least substantially perpendicularly. In other words, the leg or legs of the cover element may in particular be oriented orthogonally to an extension plane of the cover section.

According to the invention, it is provided (in an assembled state of the lock) that the first leg of the cover element engages behind the engaging section of the cup element. The behind engagement is such that the cover element is thereby secured to the cup element. In particular, the cover element may in this way (especially due to the behind engagement) be positively locked against being removed from the cup element in a direction facing away from the base (in particular perpendicular to the base). Preferably, the cover element is fastened to the cup element solely by way of the first leg and, if necessary, one or more further legs which in particular are generally of the same type (such as the second leg described further below). This means that in such an embodiment there are no additional fastening means for securing the cover element to the cup element.

By securing the cover element to the cup element, the lock housing is at once secured in a locked state. Therefore, the design and assembly of the lock housing are comparatively simple; nevertheless, the interior space of the lock body is reliably protected against outside access by the lock housing.

The behind engagement of the engaging section of the cup element by the first leg of the cover element may be effected due to a resilient design of the first leg. For example, when the cover element is connected to the cup element, the first leg of the cover element may latch onto the engaging section of the cup element. However, the behind engagement of the engaging section of the cup element by the first leg of the cover element may also be brought about by plastic deformation of the first leg.

The designation of said leg as the first leg does not imply that the cover element necessarily comprises another leg or a plurality of further legs, nor is it to be understood in the sense of a hierarchy between a possible plurality of legs, but merely serves to be able to conceptually distinguish a possible plurality of legs of the cover element.

Further advantageous embodiments of the invention are explained below.

In some embodiments, the first through-opening of the cup element may be formed at the base of the cup element.

In some embodiments, the engaging section of the cup element may be formed by an edge portion of the first through-opening, wherein the first leg of the cover element extends through the first through-opening of the cup element to engage behind the engaging section or edge portion of the first through-opening.

In such embodiments, it may be provided for, that the locking section of the locking element (in its locked position) and the first leg of the cover element substantially completely fill the first through-opening of the cup element. In this way, the locking section of the locking element may block the first leg of the cover element against a release from the engaging section or the edge portion of the first through-opening.

In other embodiments, the circumferential wall of the cup element may comprise at least a first engaging recess, wherein the first leg of the cover element engages with the first engaging recess, and wherein the engaging section of the cup element is formed by an edge portion of the first engaging recess. In such embodiments, the first leg of the cover element need not necessarily extend to the first through-opening of the cup element and, in particular, need not extend to the base of the cup element. The first leg of the cover element may—with respect to its longitudinal extent-cooperate with the engaging section of the cup element, in particular in the lateral direction. In other embodiments, the base of the cup element may comprise at least a first engaging recess, wherein the first leg of the cover element engages the first engaging recess, and wherein the engaging section of the cup element is formed by an edge portion of the first engaging recess.

In particular, the first engaging recess may be formed by a free space that is recessed with respect to its surroundings so that engagement may take place in the free space. For example, the first engaging recess may be a recess, a groove, a blind hole or also a through-opening in the base and/or in the wall of the cup element. It is preferred if the first engaging recess is circumferentially closed, i.e. is bound by a continuous circumferential edge. Preferably, the first engaging recess is open (at least) towards said interior space of the lock body or the cup element; in the case of a through-opening, it is open on both sides (both inwardly and also outwardly). Said engaging section may be provided at an edge of the first engaging recess and may in particular be formed as a latching edge. If the wall of the cup element has the engaging recess, an inner surface (i.e. a surface facing said interior space of the lock housing or the cup element) of the cup element and an edge surface of the first engaging recess preferably meet at the engaging section. If, on the other hand, the base has the engaging recess, an outer surface (i.e. a surface facing away from said interior space) of the cup element and an edge surface of the first engaging recess preferably meet at the engaging recess.

The designation of said engaging recess as a first engaging recess does not imply that the cup element necessarily has another recess or a plurality of further engaging recesses, nor is it to be understood in the sense of a hierarchy between a possible plurality of engaging recesses, but merely serves to be able to conceptually distinguish possible several engaging recesses of the cup element.

In some embodiments, the cup element may comprise a plurality of first engaging recesses of the type mentioned, each having an engaging section so that the first leg of the cover element may selectively engage with one of the plurality of first engaging recesses and engage behind one of its engaging sections. In particular, the first engaging recesses may be arranged in such a way that the size of the lock housing may be adjusted by the selecting of a respective one of the engaging recesses. In particular, due to the plurality of first engaging recesses, the cover section of the cover element can be arranged at different distances from the base of the cup element depending on which of the first engaging recesses the first leg engages with or which of the first engaging recesses the first leg engages behind the engaging section of. In particular, with respect to an assembly direction of the cover element, the plurality of first engaging recesses may be arranged one behind the other and/or at different distances from the base of the cup element.

Generally, the first leg of the cover element preferably extends from the inside, i.e. from within the lock body (in particular from said interior space of the lock housing or the cup element), at least partially through the first through-opening or into the first engaging recess. Generally, it may be provided for, that the first leg extends only through a portion of the first through-opening. In some embodiments, however, the first leg extends through the first through-opening, in particular outwards, i.e. to an outer side of the cup element (in particular, out of said interior space of the lock housing or cup element). For example, the first leg may engage behind an edge of the first through-opening of the cup element in that it engages in a latch receiver formed at the edge, at least substantially perpendicular to the direction in which it extends through the first through-opening. The engaging section may then be formed by an edge which bounds this latch receiver. However, it is not necessary to provide a latch receiver. For example, the first leg may also engage behind the edge of the first through-opening in that it lies against an outer side of the cup element, in particular the base of the cup element, by means of a fastening projection, for example (described further below). In this respect, said engaging section may be formed by a transition between the edge of the first through-opening and an outer side of the cup element, namely, a transition where an edge surface of the first through-opening and an outer surface of the cup element meet, preferably at least substantially perpendicular or at an acute angle.

In some embodiments, the locking element in the locked position, i.e. when the locking section of the locking element is inserted into the locking element receiver of the lock body, may substantially fill the first through-opening of the cup element such that the locking element blocks access to the first leg of the cover element by way of the first through-opening. This may prevent a tool from being inserted into the lock body through the first through-opening in an attempted manipulation so as to release the first leg of the cover element from the engaging section of the cup element and thus allowing the cover element to be removed from the cup element.

In other embodiments, as explained, the locking section of the locking element and the first leg of the cover element may together substantially completely fill the first through-opening of the cup element.

Both in embodiments in which the engaging section of the cup element is formed at the first through-opening (in particular at the base of the cup element) and in embodiments in which the engaging section of the cup element is formed at a first engaging recess (in particular at the wall of the cup element), the locking section of the locking element inserted into the locking element receiver may block the first leg of the cover element against being released from the engaging section. This blocking effect may take place—in relation to the longitudinal extent of the first leg—in particular in the lateral direction. What is meant by this blocking effect is that the locking section of the locking element makes it impossible, due to its spatial arrangement, for the first leg of the cover element to release from the engaging section of the cup element. In particular, the first leg of the cover element may be blocked in that the locking section, when inserted into the locking element receiver, occupies a space into which the first leg of the cover element would have to be moved to in order to be removed from the engaging section of the cup element (and thus no longer engage behind the engaging section). By blocking a releasing of the first leg from the engaging section, the cover element is at the same time secured to the cup element. This securing occurs automatically when the locking section of the locking element is inserted into the locking element receiver and is thus advantageously always present when the locking element is in the locked state.

For said blocking effect, it may be provided for, that the locking section of the locking element inserted into the locking element receiver is arranged directly adjacent to the first leg of the cover element in such a way that the locking section and the first leg overlap each other as viewed in the transverse direction (i.e. perpendicular to the longitudinal extent of the first leg).

In the embodiments in which, in the locked state of the locking element, both the locking section of the locking element and the first leg of the cover element extend through the first through-opening, the first leg of the cover element may be blocked especially reliably by the locking section against release from the engaging section and leaving the first through-opening. Preferably, the locking section and the first leg completely fill the first through-opening (at least in the direction in which the first leg would have to be moved for release).

According to a further advantageous embodiment, the first leg of the cover element may be elastically deflected in such a way that when the locking element receiver is free, it may be released from the engaging section of the cup element by opposing a restoring force (in particular only by opposing a restoring force), i.e. it may be guided past the engaging section. When the locking element receiver is free and the locking section of the locking element is thus not inserted into the locking element receiver, the first leg may indeed be moved away from the engaging section of the first engaging recess such that it no longer engages behind the engaging section and may consequently be removed from the first through-opening or the first engaging recess. However, in this embodiment, said restoring force must be overcome for this purpose, which advantageously prevents the engagement behind the engaging section from being released by the first leg too easily or even on its own.

This ensures that even when the lock is open, i.e. when the locking section of the locking element is not inserted into the locking element receiver (open state), the cover element is held at the cup element and continues to lock it. The restoring force may also advantageously result in the first leg automatically engaging the engaging section of the cup element when the cup element is closed by the cover element during assembly. This simplifies the assembly, in particular an automated assembly, of the lock.

The elastic deflectability of the first leg may also allow an easy release of the cover element from the cup element, thereby allowing the lock housing to be easily opened. Whether or not the lock housing may be opened depends expediently on whether the lock is locked: as long as the locking element is in its locked state, the lock housing is secured against opening by the locking element; if, on the other hand, the locking element receiver is free, the cover element may be released from the cup element (at least insofar as it is fastened to the cup element via the first leg).

As long as the first leg engages behind the engaging section of the cup element, the first leg may generally be in a rest position with respect to its elastic deflectability. However, according to an advantageous embodiment, the first leg may also be pretensioned against the engaging section of the cup element, in particular against an edge of the first through-opening or against the first engaging recess, in particular by said restoring force. As a result, the first leg presses permanently against the engaging section, which, on the one hand, makes the fastening of the cover element to the cup element even more reliable and, on the other hand, contributes to a tight fit of the components of the lock housing, which may prevent the components from rattling.

According to a further advantageous embodiment, the first leg comprises, at an end of its longitudinal extent remote from the cover section, a fastening projection which projects from the first leg transverse to the longitudinal extent thereof. Advantageously, the first leg may then be configured to engage behind the engaging section of the cup element with the fastening projection. In particular, the fastening projection may project from the first leg perpendicularly to the longitudinal extent of the first leg and in particular thus parallel to the cover section of the cover element. In particular, if the first leg can be elastically deflected in the aforementioned manner, the fastening projection may also be configured as a latch projection.

According to a preferred further development of this embodiment, the fastening projection may be formed as a bend. Such a bend may be formed, in particular, by simply bending said end of the first leg, which simplifies the manufacture of the cover element.

According to a further advantageous embodiment, the first leg lies against a first wall section of the wall of the cup element. In other words, the first leg of the cover element and said first wall section of the wall of the cup element are in direct contact with each other along a boundary surface. In this way, the first leg may be guided by the first wall section when the cover element is mounted to the cup element and may also be supported at the wall section after mounting. Moreover, it also prevents the interior space of the cup element from being substantially restricted by the first leg.

Insofar as the engaging section of the cup element is formed by an edge portion of the first through-opening, the engaging section may in particular be formed at that edge portion of the first through-opening which bounds the first through-opening in that direction in which the first wall section is orientated. Insofar as the first leg comprises said fastening projection, said fastening projection may in particular project from the first leg in the very same direction.

According to a further advantageous embodiment, the cup element may comprise a further engaging section, wherein the cover element comprises a second leg projecting from the cover section and engaging behind the further engaging section of the cup element, so as to secure the cover element to the cup element.

This securing is then in addition to the securing of the cover element to the cup element effected by the first leg and its engagement behind the associated engaging section. The further engaging section of the cup element may be formed at least substantially as described above. The further engaging section of the cup element may be formed, for example, by an edge portion of a second through-opening of the cup element, in particular at the base thereof, or by an edge portion of a second engaging recess of the cup element, in particular at its wall. The second through-opening may be formed at least substantially like the first through-opening. Further, the second leg may be formed at least substantially like the first leg. For example, the second leg can be elastically deflectable such that it may be moved so far away from the further engaging section that it may release from the engaging section; and/or the second leg may be pretensioned against the further engaging section; and/or the second leg may comprise, at an end of its longitudinal extent remote from the cover section, a fastening projection which projects from the second leg transverse to the longitudinal extent of the second leg, wherein the fastening projection may be formed as a bend and wherein the fastening projection of the first leg and the fastening projection of the second leg may be oriented facing away from each other. Also, the cooperation of the second leg with the further engaging section may at least substantially correspond to at least one of the above-described ways of cooperating the first leg with the associated engaging section.

In particular, if the cup element comprises a plurality of first engaging recesses, the cup element may also comprise a plurality (preferably the same number) of second engaging recesses of the type mentioned. In particular, the first and second engaging recesses may be arranged in such a way that the size of the lock housing may be adjusted by selecting a respective first engaging recess and a respective second engaging recess (in particular one associated with the respective first engaging recess). Preferably, due to the plurality of first and second engaging recesses, the cover section of the cover element can be arranged at different distances from the base of the cup element depending on which of the first engaging recesses the first leg engages with or which of the first engaging recesses the first leg engages behind the engaging section of, and which of the second engaging recesses the second leg engages with or which of the second engaging recesses the second leg engages behind the engaging section of.

According to an advantageous embodiment, the first leg of the cover element lies against a first wall section of the wall of the cup element and the second leg of the cover element lies against a second wall section of the wall of the cup element, which is arranged opposite to said first wall section. In other words, the first leg and the second leg are adjacent to each other, in particular are located at diametrically opposite wall sections of the wall of the cup element.

Provided that the further engaging section is formed at said second through-opening, the further engaging section, which the second leg engages behind, may be formed in particular at that edge of the second through-opening which bounds the second through-opening in that direction in which the second wall section is oriented. Insofar as the second leg comprises said fastening projection, this fastening projection may in particular project from the second leg in the same direction. This direction is preferably exactly opposite to the direction in which the first leg engages behind the engaging section formed at the edge of the first through-opening. In particular, the first leg and the second leg may be pretensioned in mutually opposite directions against the engaging section of the respective engaging recess, in particular against the respective edge of the first or second through-opening.

According to a further advantageous embodiment, the lock body comprises a further locking element receiver, wherein in the locked state, the locking element is inserted with a further locking section into the further locking element receiver, and the cup element, in particular the base of the cup element, comprises a second through-opening (in particular the one already mentioned above) through which the further locking section can be inserted into the further locking element receiver. Thus, in this embodiment, the locking element comprises two locking sections which respectively may be locked or secured to the lock body. The locking section and the further locking section are preferably arranged at opposite ends of the locking element.

The locking element of such an embodiment may, for example, be a U-shaped rigid hoop whose free ends form the locking section and the further locking section, for example as in a padlock. According to a further embodiment, the locking element may be for example a flexible hoop (such as a chain, a wire rope or a joint bar arrangement), in particular with a respective bolt as the locking section at the free ends. In some embodiments, the further locking section of the locking element may also be permanently inserted into and secured in the further locking element receiver during ordinary use of the lock, that is, not only in the locked state of the locking element but also in an open state. For example, such an embodiment is possible in a padlock having a U-shaped hoop with two legs of different lengths, or in a lock having a flexible hoop.

The cooperation of the further locking section with the second through-opening and the second leg may in particular at least substantially correspond to the cooperation of said locking section with the first through-opening and the first leg. In particular, in the locked state of the locking element, the second leg may be blocked from being released from the further engaging section by the further locking section inserted into the further locking element receiver, namely, for example in that the further locking section when inserted into the further locking element receiver occupies a space into which the second leg would have to be moved to in order to release it from the further engaging section (i.e. to no longer engage behind the engaging section). When the further engaging section is formed at the second through-opening and the second leg extends through the second through-opening, the second leg for example may therefore be blocked against release from the further engaging section and from leaving the second through-opening, that the further locking section occupies a space within the second through-opening into which the second leg would have to be moved to in order to release it from the further engaging section and to leave the second through-opening. Preferably, the further locking section and the second leg completely fill the second through-opening (at least in the direction in which the second leg would have to be moved to for releasing).

For reliable securing of the cover element to the cup element, the second leg does not necessarily have to be blocked by a further locking section inserted into a further locking element receiver. Rather, there may also be some other way to prevent the second leg from being released from the further engaging section. For example, it may be provided that the cup element, in particular the base of the cup element, comprises a second through-opening, but without providing that a further locking section of the locking element would be inserted through the second through-opening into a further locking element receiver of the lock body; but rather, in this case, the second through-opening (if necessary, in addition to the second leg extending through it so that the leg may engage behind an engaging section formed at an edge of the second through-opening) serves to enable a securing element, which for example may be formed as a securing plate, to be inserted into the lock body, advantageously in such a way that it blocks the second leg from release from the further engaging section. Such a securing element may be held preferably captively, in particular as a force-fit and/or as a form-fit, in the lock body, for example, by latching to a structure of the lock body or by caulking.

Furthermore, it is generally also conceivable, provided there is no need to open the lock body again at a later date, to connect the second leg non-releasably to the further engaging section or other section of the cup element, for example by welding or bonding. In this case, the behind engagement of the further engaging section may primarily serve as a first securing of the cover element to the cup element during assembly, before the permanent connection is made. Fundamentally, it is also conceivable to connect in this way the first leg non-releasably to the associated engaging section or other section of the cup element.

According to a further advantageous embodiment, the locking element comprises a coupling section with which it is permanently mounted to the lock body. The coupling section may be provided as an alternative to said further locking section, in particular provided at said end of the locking element opposite to the locking section. Generally, however, it is also conceivable that the locking element, in addition to the locking section, comprises both the further locking section and the coupling section. For example, the locking element may have a branched contour and thus a plurality of ends, wherein the locking section, the further locking section and the coupling section are then preferably provided at a respective different one of these ends.

The coupling section may in particular be mounted to the wall of the cup element of the lock housing or mounted through the wall to the lock housing. Preferably, the coupling section is mounted to a wall section of the wall or mounted through a wall section of the wall, the wall section is different from said first wall section, is preferably arranged opposite thereto and in particular may be said second wall section.

The coupling section is preferably permanently mounted to the lock body in that it is non-releasable from the lock body, i.e. cannot be released from the lock body without damaging the lock. For example, the coupling section may be mounted by riveting to the lock body.

According to a further advantageous embodiment, the locking section of the locking element comprises a locking recess and the first leg of the cover element of the lock housing also comprises a locking recess, wherein the locking mechanism comprises a latch which can be adjusted between a locking position and an unlocking position and is configured such that in the locking position, if the locking element is in the locked state, the latch engages both the locking recess of the locking section and the locking recess of the first leg and thereby locks the locking section against leaving the locking element receiver. In this respect, the locking recess of the locking section may correspond to the locking structure of the locking section already mentioned above. On the other hand, in the unlocking position, the latch advantageously does not engage at least in the locking recess of the locking section, preferably also not in the locking recess of the first leg, so that the locking section is released for leaving the locking element receiver.

In particular, in the locking position, provided that the locking element is in the locked state, the latch may engage through the locking recess of the locking section into the locking recess of the first leg. The locking recess of the locking section may be formed as a through-opening for this purpose. Particularly for reasons of ease of manufacture, for example by stamping, the locking recess of the first leg may also be formed as a through-opening. Expediently, the locking recess of the locking section and the locking recess of the first leg are aligned with each other when the locking section is inserted into the locking element receiver of the lock body, so that in its locked position, the latch may easily engage in both locking recesses.

According to a further advantageous embodiment, the cup element, preferably the wall of the cup element, comprises an opening through which the locking mechanism extends through or may be actuated by means of a key for example. Preferably, the locking mechanism is arranged at least largely within the lock housing in order to be protected against manipulation from the outside. However, said opening allows the locking mechanism to be actuated from the outside. Thus, to prevent access to the interior of the lock housing through the opening, the opening is preferably completely filled by the locking mechanism, whether or not the locking mechanism extends to the opening or extends through the opening.

The opening is preferably formed in a third wall section of the wall of the cup element, which is different from said first wall section (and where appropriate said second wall section) and which is preferably oriented at least substantially perpendicular to said first wall section (and where appropriate to said second wall section).

Generally, the cover element (instead of the cup element) may also comprise such an opening through which the locking mechanism extends or can be actuated. Furthermore, it is not absolutely necessary that the lock housing as a whole has such an opening at all. In particular, if the locking mechanism comprises an electronic lock cylinder, a comparatively small opening may be sufficient or no opening at all may be provided.

According to a further advantageous embodiment, the cover section of the cover element is closed throughout, i.e. has no opening. This contributes to the stability of the cover element and in particular of the cover section.

Furthermore, it is preferred that the first leg and the second leg are configured rotationally-symmetrical and/or mirror-symmetrical to each other. In particular, according to a further advantageous embodiment, the cover element may be configured as a whole to be rotationally-symmetrical and/or mirror-symmetrical.

Furthermore, generally independent of the design of the cover element, the cup element may also be configured as a whole at least substantially rotationally-symmetrical and/or mirror-symmetrical (in particular, apart from said opening through which the locking mechanism extends or can be actuated, and/or apart from a section to which said coupling section of the locking element is mounted).

DRAWINGS

The invention is further explained in the following merely by way of example with reference to the figures.

DESCRIPTION OF THE INVENTION

Figure 1:
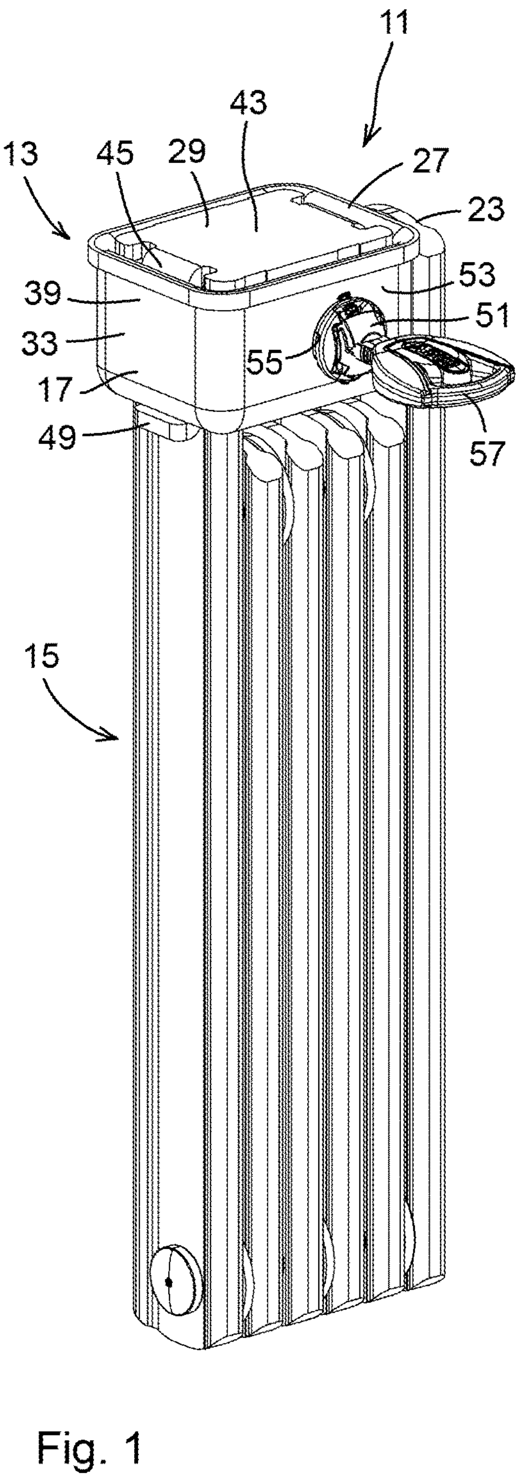
FIG. 1 shows a perspective view of an embodiment of a lock according to the invention.

The lock 11 according to the invention shown in FIGS. 1 to 4 is configured as a joint bar lock which comprises a lock body 13 and a locking element 15 formed as a joint bar arrangement consisting of a plurality of joint bars pivotally connected to one another. The lock body 13 comprises a lock housing 17 which encloses an interior space 19 of the lock body 13 (see FIG. 1) and has a locking element receiver 21.

Figure 2:
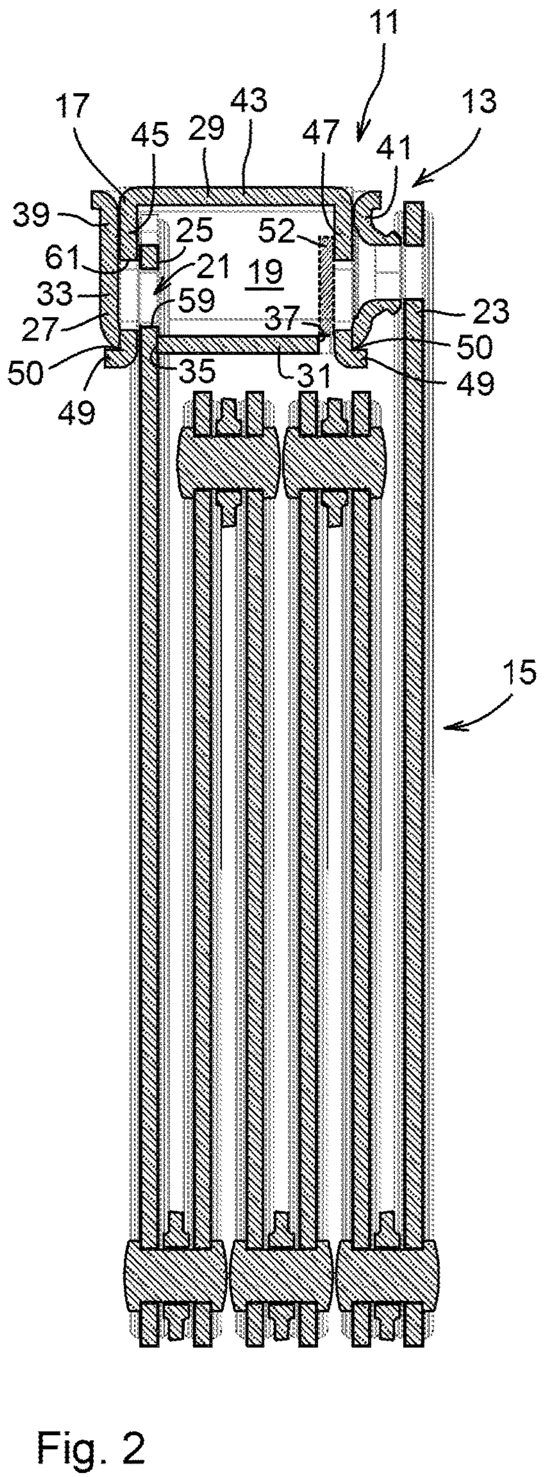
FIG. 2 shows the same lock in a sectional view.

A first end of the extent of the locking element 15 forms a coupling section 23, with which the locking element 15 is permanently fixed to the lock body 13, namely, by riveting. An opposite second end of the extent of the locking element 15 forms a locking section 25, with which the locking element 15 may be inserted into the locking element receiver 21. When the locking element 15 is inserted with the locking section 25 into the locking element receiver 21 it is in a locked state which is shown in FIGS. 1 and 2 and which corresponds to a locked state of the lock 11.

Figure 3:
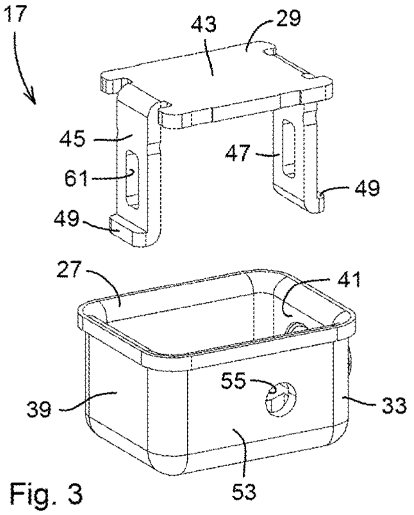
FIG. 3 shows the cup element and the cover element of the lock housing of the lock as separate components viewed from a first direction.
Figure 4:
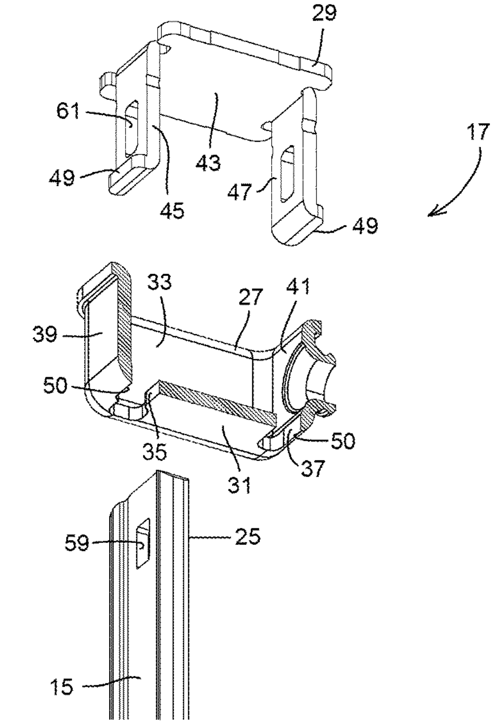
FIG. 4 shows the cup element and the cover element of the lock housing together with the locking section of the locking element of the lock as separate components viewed from a second direction, wherein a sectional view of the cup element is shown.

The lock housing 17 comprises a cup element 27 and a cover element 29 which are shown separately in FIGS. 3 and 4. The cup element 27 is configured as a one-piece deep-drawn sheet metal part with a collar reinforcement and has an at least substantially rectangular flat base 31 and a wall 33 projecting at least substantially perpendicular from the entire edge of the base 31 and thus surrounding it. The cup element 27 thus has a cuboid shape, one side of which is formed by the base 31 and its four adjacent sides are formed by four flat wall sections of the wall 33. At the sixth side of the cuboid, the cup element 27 is however open. The edges of the cuboid, at which each one of the wall sections of the wall 33 is connected to the base 31 or an adjacent wall section, are rounded.

As can be seen in particular in FIG. 4 showing a sectional view of the cup element 27, the base 31 has a first through-opening 35 and a second through-opening 37. The first through-opening 35 is arranged adjacent to a first wall section 39 of the wall 33, while the second through-opening 37 is arranged adjacent to a second wall section 41 of the wall 33 which is diametrically opposite to the first wall section 39 and to which the coupling section 23 of the locking element 15 is fixed. The first through-opening 35 forms the entrance of the locking element receiver 21, through which the locking section 25 of the locking element 15 may be inserted into the locking element receiver 21 (see FIG. 2). In the embodiment shown, the first wall section 39 and the second wall section 41 are adjacent to the two shorter sides of the rectangular shape of the base 31 of the cup element 27.

The cover element 29 is configured as a stamped bent part and has an at least substantially rectangular flat cover section 43, the dimensions of which correspond to those of the base 31, but which, unlike the base 31, is closed throughout. At the two shorter sides of the rectangular shaped cover section 43, a first leg 45 and a second leg 47 are formed, which are bent out from the plane of the cover section 43 relative thereto, so that they project at least substantially perpendicular from the cover section 43. The legs 45, 47 are formed as one piece with the cover section 43. At their respective free end, i.e. the end remote from the cover section 43, the legs 45, 47 each have a fastening projection 49 in the form of a bend. The fastening projections 49 are oriented in a direction pointing away from each other. The cover element 29 is overall mirror-symmetrical with respect to a mirror plane perpendicular to the cover section 43 and parallel to the legs 45, 47, and is rotationally-symmetrical with respect to an axis of symmetry perpendicular to the cover section 43.

As can be seen in particular from the sectional view of FIG. 2, the cover element 29 is arranged at the cup element 27 in such a way that the first leg 45 extends along the first wall section 39 into the first through-opening 35 and through it. Moreover, the first leg 45 with its fastening projection 49 engages behind an engaging section 50 of the cup element 27, which engaging section 50 is formed by an edge portion of the first through-opening 35 oriented towards the first wall section 39. In a corresponding manner, the second leg 47 extends along the second wall section 41 into the second through-opening 37 and extends through it. Likewise, the second leg 47 with its fastening projection 49 engages behind an engaging section 50 of the cup element 27 which is formed by an edge portion of the second through-opening 37 oriented towards the second wall section 41 (see FIGS. 2 and 4). Overall, this secures in a form-fit the cover element 29 to the cup element 27. This state is shown in FIGS. 1 and 2, in which it can be seen that the cover section 43 of the cover element 29 closes the cup element 27, so that the lock housing 17 as a whole (apart from openings such as said through-openings 35, 37) is closed all around.

To attach the cover element 29 to the cup element 27, the two legs 45, 47 may be elastically deflected towards each other. As soon as the fastening projections 49 have passed through the respective through-opening 35, 37, the legs return back in the direction away from each other due to a respective restoring force, so that the legs 45, 47 of the cover element 29 at said edges of the through-openings 35, 37 of the base 31 of the cup element 27 respectively engage behind the engaging sections 50. This secures the cover element 29 to the cup element 27, generally, however, it may also be detached again from the cup element 27 in that the legs 45, 47 are deflected towards each other until the fastening projections 49 no longer engage behind the engaging sections 50 and therefore may leave again the through-openings 35, 37.

However, this is only possible as long as the legs 45, 47 may be deflected towards each other. In the locked state of the locking element 15, however, its locking section 25 extends through the first through-opening 35 and together with the first leg 45 at least substantially completely fills the first through-opening 35 (see in particular FIG. 2), so that the first leg 45 cannot be deflected towards the second leg 47. As a result, the locking section 25 inserted in the locking element receiver 21 blocks the first leg 45 against release from the engaging section 50 of the first through-opening 35. Moreover, since said interior space 19 of the lock body 13 is largely filled by a locking mechanism 51 received in the lock housing 17, the second leg 47 is also prevented from being deflected towards the first leg 45 so that the second leg 47 is also blocked against release from the engaging section 50 of the second through-opening 37. Furthermore, a securing element, for example in the form of a securing plate 52, may be additionally provided, which is inserted into the lock body 13 and blocks the second leg 47 against release from the engaging section 50 of the second through-opening 37. The securing plate 52, which is shown with a dashed line in FIG. 2, may for example be inserted through the second through-opening 37 into the interior space 19 of the lock housing 17.

The locking mechanism 51, which is only shown in FIG. 1, comprises a lock cylinder which extends slightly out of the lock housing 17 through an opening 55 formed in a third wall section 53. By means of a key 57 associated with the lock cylinder, the locking mechanism 51 may be actuated to move a latch of the locking mechanism 51, not shown in the figures, selectively between a locking position and an unlocking position.

In the locked position, if the locking element 15 is inserted into the locking element receiver 21, the latch engages in a locking recess 59 formed at the locking section 25 of the locking element 15 and moreover engages through this locking recess 59 into a locking recess 61 formed at the first leg 45 which is aligned with the locking recess 59 of the locking section 25 in the locked state of the locking element 15 (see FIGS. 2 and 4). In this way, the latch of the locking mechanism 51 in its locked position, locks the locking element 15 against leaving the locking element receiver 21. If, on the other hand, the latch is moved into its unlocked position by actuating the locking mechanism 51, it no longer engages in the locking recesses 59, 61, so that the locking element 15 is released for leaving the locking element receiver 21.

Figure 5:
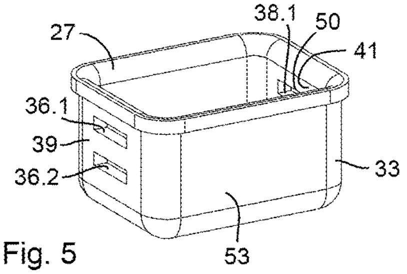
FIG. 5 shows the cup element of an alternative embodiment as a separate component viewed from the first direction.

FIG. 5 shows an example of a possible alternative design of the cup element 27, whereby the lock 11 may otherwise be configured substantially identical to the lock 11 described above. The base 31 of the cup element 27 again comprises the first through-opening 35 and the second through-opening 37 (which are not shown due to the viewing direction of FIG. 5). In addition, the cup element 27 has separate first and second engaging recesses 36.1, 36.2 or 38.1, which, in this embodiment, are formed in the wall 33 of the cup element 27. Thus, the engaging recesses 36.1, 36.2, 38.1 of the wall 33 of the cup element 27 are not oriented axially with respect to the longitudinal extent of the legs 45, 47 of the cover element 29 (such as the through-openings 35, 37 of the base 31), but rather laterally.

In the example shown, two first engaging recesses 36.1, 36.2 are formed in the first wall section 39 and two second engaging recesses 38.1 are formed in the second wall section 41, of which only one can be seen from the viewing direction of FIG. 5. These first and second engaging recesses 36.1, 36.2, 38.1 each extend through the wall 33 as through-openings.

Those edge portions of the engaging recesses 36.1, 36.2, 38.1 which face the interior space 19 of the lock body 13 (see FIG. 2) and the cover section 43 of the cover element 29 (see FIG. 1)—i.e. the inner and upper horizontal edges of the engaging recesses 36.1, 36.2, 38.1 of FIG. 5, of which only the engaging recess 38.1 can be seen-form engaging sections 50 of the cup element 27. These engaging sections 50 may be engaged in from behind by the legs 45, 47 of the cover element 29 in order to secure the cover element 29 to the cup element 27.

In the embodiment shown in FIG. 5, the cover element 29 may selectively be arranged at the cup element 27 in such a way that either the first leg 45 engages the upper (remote to the base) first engaging recess 36.1 and the second leg 47 engages the upper (remote to the base) second engaging recess 38.1, or the first leg 45 engages the lower (closer to the base) first engaging recess 36.2 and the second leg 47 engages the lower (closer to the base) second engaging recess (not shown). In addition, as in the embodiment shown in FIGS. 1 to 4, the first through-opening 35 and the second through-opening 37 may still function as a further first engaging recess and as a further second engaging recess, into which the first leg 45 and the second leg 47 may engage respectively. In this way, the cover section 43 of the cover element 29 may be arranged at two or three different distances from the base 31 of the cup element 27. In each of the two or three different positions of the cover element 29 relative to the cup element 27, the first leg 45 may be blocked from leaving the respective first engaging recess 36.1, 36.2 by the locking section 25 of the locking element 15 inserted into the locking element receiver 21, while the second leg 47 may be blocked from leaving the respective second engaging recess 38.1, in particular by said securing plate 52, any other securing element or by the locking mechanism 51 received in the lock housing 17.

With regard to the embodiment example shown in FIG. 5, it should be noted that also only a single (lateral) engaging recess 36.1, 36.2, 38.1 could be provided for each leg 45, 47 of the cover element 29. Furthermore, the engaging recesses 36.1, 36.2, 38.1 need not be configured as through-openings, but could also be (closed) recesses.

The design of the lock 11 according to the invention advantageously enables a comparatively less complex assembly of the lock 11. Thus, the lock housing 17 may be locked in an easy manner, in particular also automatically as part of the assembly of the lock 11. However, should it become necessary, the lock may also be opened again in a similarly easy manner. Nevertheless, the lock housing 17 is reliably secured against being opened when the lock 11 is locked (i.e. when the locking element 15 is in a locked state).

What is claimed is:

1. A lock comprising:

a lock body comprising a lock housing and having at least one locking element receiver;

a locking element which can be brought into a locked state in which the locking element is inserted with a locking section into the locking element receiver; and a locking mechanism which is at least partially accommodated in the lock housing and selectively blocks the locking element in its locked state from leaving the locking element receiver or releases it for leaving the locking element receiver;

wherein the lock housing comprises a cup element having a base and a circumferential wall projecting from the base, and a cover element which closes the cup element, wherein the cup element comprises a first through-opening and an engaging section, wherein the locking section of the locking element can be inserted through the first through-opening into the locking element receiver, and wherein the cover element comprises a cover section and a first leg projecting from the cover section along a longitudinal direction which engages behind the engaging section of the cup element such that the first leg, upon movement opposite to the longitudinal direction, comes into abutment with the engaging section and is thereby positively locked against disengaging from the cup element, in order to secure the cover element to the cup element;

wherein the cover element is formed as an integral one-piece component.

2. The lock according to claim 1, wherein the first through-opening is formed at the base of the cup element.

3. The lock according to claim 1, wherein the engaging section of the cup element is formed by an edge portion of the first through-opening, wherein the first leg of the cover element extends through the first through-opening.

4. The lock according to claim 1, wherein the cup element comprises at least a first engaging recess, wherein the first leg of the cover element engages with the first engaging recess, and wherein the engaging section of the cup element is formed by an edge portion of the first engaging recess.

5. The lock according to claim 4, wherein the wall of the cup element comprises a plurality of first engaging recesses, wherein the cup element comprises a plurality of engaging sections each formed by an edge portion of one of the plurality of first engaging recesses, and wherein the first leg of the cover element engages with one of the plurality of first engaging recesses and engages behind the edge portion of this engaging recess.

6. The lock according to claim 1, wherein, when the locking section of the locking element is inserted into the locking element receiver of the lock body, the locking element substantially fills the first through-opening of the cup element in such a way that the locking element blocks access to the first leg of the cover element through the first through-opening.

7. The lock according to claim 1, wherein, in the locked state of the locking element, the first leg of the cover element is blocked against release from the engaging section of the cup element by the locking section inserted in the locking element receiver.

8. The lock according to claim 1, wherein the first leg of the cover element is elastically deflectable in such a way that when the locking section of the locking element is not inserted into the locking element receiver of the lock body, by opposing a restoring force, the first leg may be released from the engaging section of the cup element.

9. The lock according to claim 1, wherein the first leg of the cover element is pretensioned against the engaging section of the cup element.

10. The lock according to claim 1, wherein the first leg of the cover element has a longitudinal extent, wherein the first leg comprises at an end of its longitudinal extent remote from the cover section a fastening projection which projects from the first leg transverse to the longitudinal extent of the first leg.

11. The lock according to claim 10, wherein the fastening projection is formed as a bend.

12. The lock according to claim 1, wherein the cup element comprises a further engaging section, and wherein the cover element comprises a second leg projecting from the cover section which engages behind the further engaging section of the cup element in order to secure the cover element to the cup element.

13. The lock according to claim 12, wherein the first leg of the cover element lies against a first wall section of the wall of the cup element, and wherein the second leg of the cover element lies against a second wall section of the wall of the cup element, which is arranged opposite to the first wall section.

14. The lock according to claim 12, wherein the lock body comprises a further locking element receiver, wherein in the locked state the locking element is inserted with a further locking section into the further locking element receiver, and wherein the cup element comprises a second through-opening through which the further locking section can be inserted into the further locking element receiver.

15. The lock according to claim 12, wherein the wall of the cup element comprises at least a second engaging recess, wherein the second leg of the cover element engages with the second engaging recess, and wherein the further engaging section of the cup element is formed by an edge portion of the second engaging recess.

16. The lock according to claim 1, wherein the locking element comprises a coupling section with which the locking element is permanently mounted to the lock body.

17. The lock according to claim 1, wherein the locking section of the locking element comprises a locking recess, wherein the first leg of the cover element of the lock housing comprises a locking recess, and wherein the locking mechanism comprises a latch which is adjustable between a locking position and an unlocking position, and in the locking position engages in the locking recess of the locking section and also engages in the locking recess of the first leg provided that the locking element is in the locked state, and thereby blocks the locking section against leaving the locking element receiver.

18. The lock according to claim 1, wherein the cup element comprises an opening through which the locking mechanism extends through or can be operated.

19. The lock according to claim 1, wherein the cover element is formed rotationally-symmetrical and/or mirror-symmetrical.

20. A lock comprising:

a lock body comprising a lock housing and having at least one locking element receiver;

a locking element which can be brought into a locked state in which the locking element is inserted with a locking section into the locking element receiver; and a locking mechanism which is at least partially accommodated in the lock housing and selectively blocks the locking element in its locked state from leaving the locking element receiver or releases it for leaving the locking element receiver;

wherein the lock housing comprises a cup element having a base and a circumferential wall projecting from the base, and a cover element which closes the cup element, wherein the cup element comprises a first through-opening and an engaging section, wherein the locking section of the locking element can be inserted through the first through-opening into the locking element receiver, and wherein the cover element comprises a cover section and a first leg projecting from the cover section which engages behind the engaging section of the cup element, in order to secure the cover element to the cup element;

wherein the first leg of the cover element is clipped onto the engaging section of the cup element.

21. A lock comprising:

a lock body comprising a lock housing and having at least one locking element receiver;

a locking element which can be brought into a locked state in which the locking element is inserted with a locking section into the locking element receiver in an axial insertion direction; and a locking mechanism which is at least partially accommodated in the lock housing and selectively blocks the locking element in its locked state from leaving the locking element receiver or releases it for leaving the locking element receiver;

wherein the lock housing comprises a cup element having a base and a circumferential wall projecting from the base, and a cover element which closes the cup element, wherein the cup element comprises a first through-opening and an engaging section, wherein the locking section of the locking element can be inserted through the first through-opening into the locking element receiver, and wherein the cover element comprises a cover section and a first leg projecting from the cover section along a longitudinal direction which engages behind the engaging section of the cup element, in order to secure the cover element to the cup element;

wherein in the locked state of the locking element, the first leg of the cover element is blocked against release from the engaging section of the cup element by the locking section inserted in the axial insertion direction into the locking element receiver;

wherein the locking section occupies a space into which the first leg of the cover element must be moved laterally relative to the longitudinal direction and/or to the axial insertion direction, in order to be removed from the engaging section of the cup element.

* * * * *